US007660818B2

(12) United States Patent
Lulu (10) Patent No.: US 7,660,818 B2
(45) Date of Patent: Feb. 9, 2010

(54) METHOD AND APPARATUS FOR QUERYING PROGRAM DESIGN MODELS

(75) Inventor: Yaser Lulu, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 10/999,749

(22) Filed: Nov. 30, 2004

(65) Prior Publication Data

US 2006/0117000 A1     Jun. 1, 2006

(51) Int. Cl.
    G06F 17/00 (2006.01)
(52) U.S. Cl. ................................. 707/103 Y
(58) Field of Classification Search ............ 707/3, 707/102, 103 Y, 103 R
    See application file for complete search history.

(56) References Cited

U.S. PATENT DOCUMENTS

| | | | |
|---|---|---|---|
| 5,857,197 A * | 1/1999 | Mullins ................... | 707/103 R |
| 6,243,710 B1 * | 6/2001 | DeMichiel et al. ........ | 707/103 R |
| 2002/0091702 A1 * | 7/2002 | Mullins ...................... | 707/100 |
| 2006/0004773 A1 * | 1/2006 | Chow et al. .................... | 707/10 |
| 2006/0064667 A1 * | 3/2006 | Freitas ........................ | 717/104 |

OTHER PUBLICATIONS

Kudrass et al., L. Kalinichenko et al. (Eds.): ADBIS 2003, LNCS 2798, pp. 339-354, 2003.*

Gaafar et al., T. Baar et al. (Eds.):UML 2004, LNCS 3273, pp. 241-259, Oct. 2004.*

Eriksson et al., UML Toolkit, John Wiley & Sons, Inc., p. XIII, 1998.*

Vanhatalo, J., Building and Querying a Repository of BPEL Process Specifications, Thesis, Universite Nice, Sophia-Antipolis, France, Sep. 13, 2004, pp. 1-85.*

Akehurst et al., M. Gogolla and C. Kobryn (Eds.): UML 2001, LNCS 2185, pp. 91-103, 2001.*

Su, et al., H. Balsters, B. de Brock, and S. Conrad (Eds.): FoMLaDo/DEMM 200, LNCS 2065, pp. 182-201. 2001.*

Akerhurst et al, Tooling Metamodels with Patterns and OCL, Metamodeling for MDA, First International Workshop, York, UK, Nov. 2003, Proceedings, edited by Andy Evans, Paul Sammut, and James S. Willans, pp. 203-215.*

Urbban et al., K.R. Dittrich et al. (Eds.): Objects and Databases 2000, LNCS 1944, pp. 185-196, 2001.*

* cited by examiner

*Primary Examiner*—Cheyne D Ly
(74) *Attorney, Agent, or Firm*—Hamilton, Brook, Smith & Reynolds, P.C.

(57) ABSTRACT

A method and apparatus for querying computer program design models (metamodels) is provided. A tree structure representation of the subject metamodel is likened to a database representation of the model elements. The invention method and apparatus logically maps a model query statement to the corresponding database version of the query. This leads to abstraction of the underlying metamodel and hence the queries targeting it in an automated and dynamic manner.

22 Claims, 7 Drawing Sheets

FIG. 1

Query Statements and Clauses

FIG. 2

Condition and ConditionPolicy

METHOD AND APPARATUS FOR QUERYING PROGRAM DESIGN MODELS

BACKGROUND OF THE INVENTION

With the proliferation of software products and services, attempts have been made to codify and/or standardize the designing of software and software architecture. Examples include:

The Booch Method and Modeling Language (see "Object Oriented Analysis and Design" by Grady Booch);

James Rumbaugh and Associates' Object Modeling Technique (OMT);

the Object Oriented Software Engineering (OOSE) method by Ivar Jacobson; and the Unified Modeling Language (UML) which combines the foregoing and industry best practices.

The UML is a visual modeling language (with formal syntax and semantics) for communicating a model or conceptualization. Thus the modeling language specification specifies modeling elements, notation and usage guidelines and not order of activities, specification of artifacts, repository interface, storage, run-time behavior and so forth. In general, at the modeling level a "problem" is posed in terms of a customer's needs and requirements and may be referred to as the business problem system. The software designer develops a "solution" software product and or service that addresses the problem. The UML syntax enables software designers to express (specify and document) the subject problems and solutions in a standardized manner, while the UML semantics enable knowledge about the subject system to be captured and leveraged during the problem solving phase. See "UML in a Nutshell" by Simon Si Alhir, published by O'Reilly & Associates, September 1998. As such, the UML enables the sharing of information (including prior solution portions) and extension (without reimplementation) of core object oriented concepts (analysis and design) during the iterative problem-solving process for designing software products.

The Rose model for UML 2.0 is commonly employed. The Eclipse Modeling Framework (EMF) can be used to generate Java code from a Rose Model.

However, to date there is no standardized, generic or extensible way to query Eclipse EMF metamodels for information. Typically, one writes ad hoc, custom search functions. Such search functions are non-portable, metamodel specific or metamodel centric and limited in scope and usage. Further such search functions are hard to learn and thus not easily shared by different users.

SUMMARY OF THE INVENTION

The present invention addresses the need for a standardized, generic and extensible way to query EMF metamodels for information.

The present invention EMF Query Framework provides the basic infrastructure for specifying and executing queries against a set of EMF Model elements and their contents. Restated, the present invention provides a computer method and apparatus that facilitates the process of search and retrieval of meta model elements of interest in a flexible yet controlled and structured manner.

In a preferred embodiment, method and apparatus for querying program design models comprise the steps of:

obtaining a tree structure representation of a subject metamodel, the subject metamodel being formed of model elements;

likening (by logically mapping, abstracting, approximating, translating, transforming or the like) the tree structure representation to a database representation of the model elements; and forming a query statement corresponding to the database representation in response to user activity (i.e. command or request) to search and retrieve desired model elements.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 7:
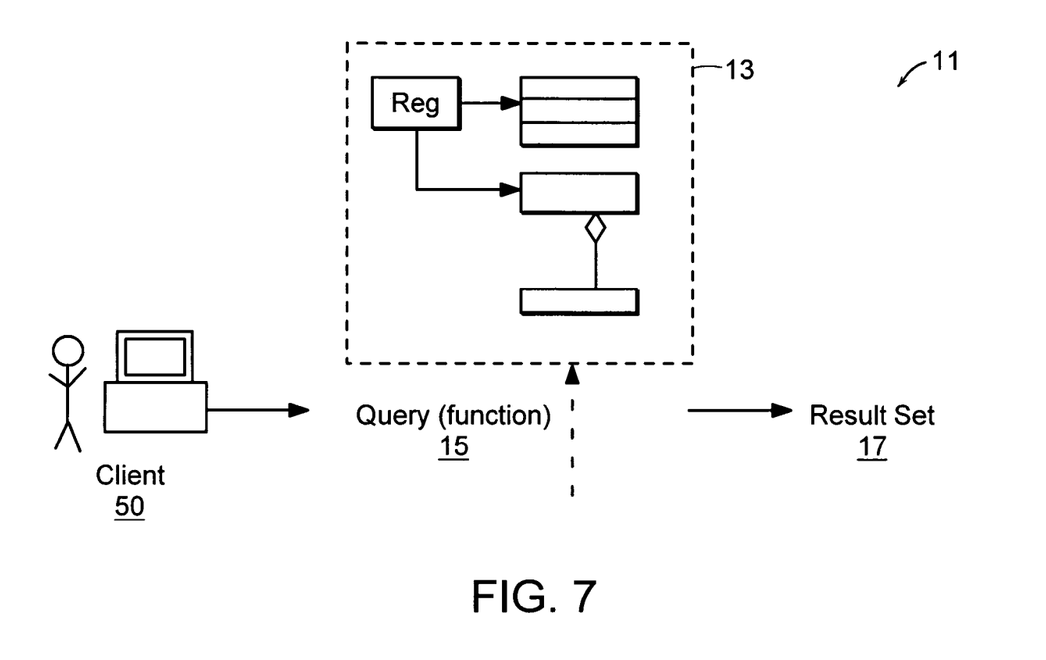
FIG. 7 is a schematic view of one embodiment of the present invention query method and apparatus.

As illustrated in FIG. 7, the present invention provides a computer method and apparatus 11 for querying program design models (EMF model elements and their contents) 13. In a way, a query 15 is equivalent to a client's function that traverses the model hierarchy 13 gathering elements of interest 17 (eventual result set) along the way. However, using a framework 11 automates this process, for it captures the invariant part of the search and retrieval process while allowing for behavioral parameterization by integrating client 50 defined "hooks" where relevant. Moreover, by virtue of control-inversion, a query framework 11 can utilize—behind the scenes—various performance enhancement techniques (e.g., a cache) and thus makes them readily available for all clients 50 at no cost, not to mention using a framework 11 makes the whole process more consistent and thus easier to learn and maintain. In short, the query framework 11 relieves the client 50 from writing the "plumbing" code and streamlines the process amongst the various clients 50.

Figure 5:
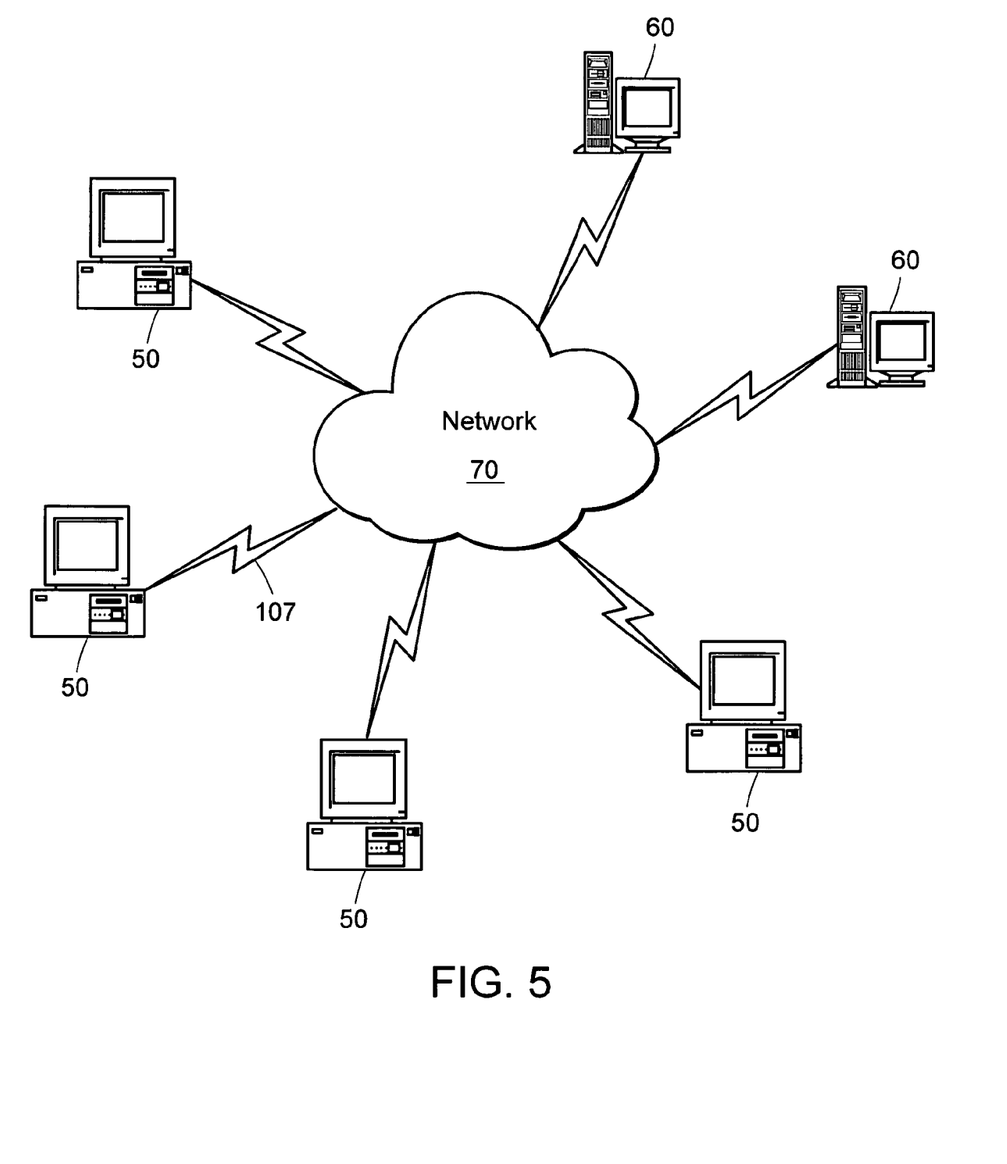
FIG. 5 is a schematic view of a computer environment in which embodiments of the present invention may be practiced.

FIG. 5 illustrates a computer network or similar digital processing environment in which the present invention may be implemented. Other computer architectures are suitable. The following is for purposes of illustration and not limitation of the present invention.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 6:
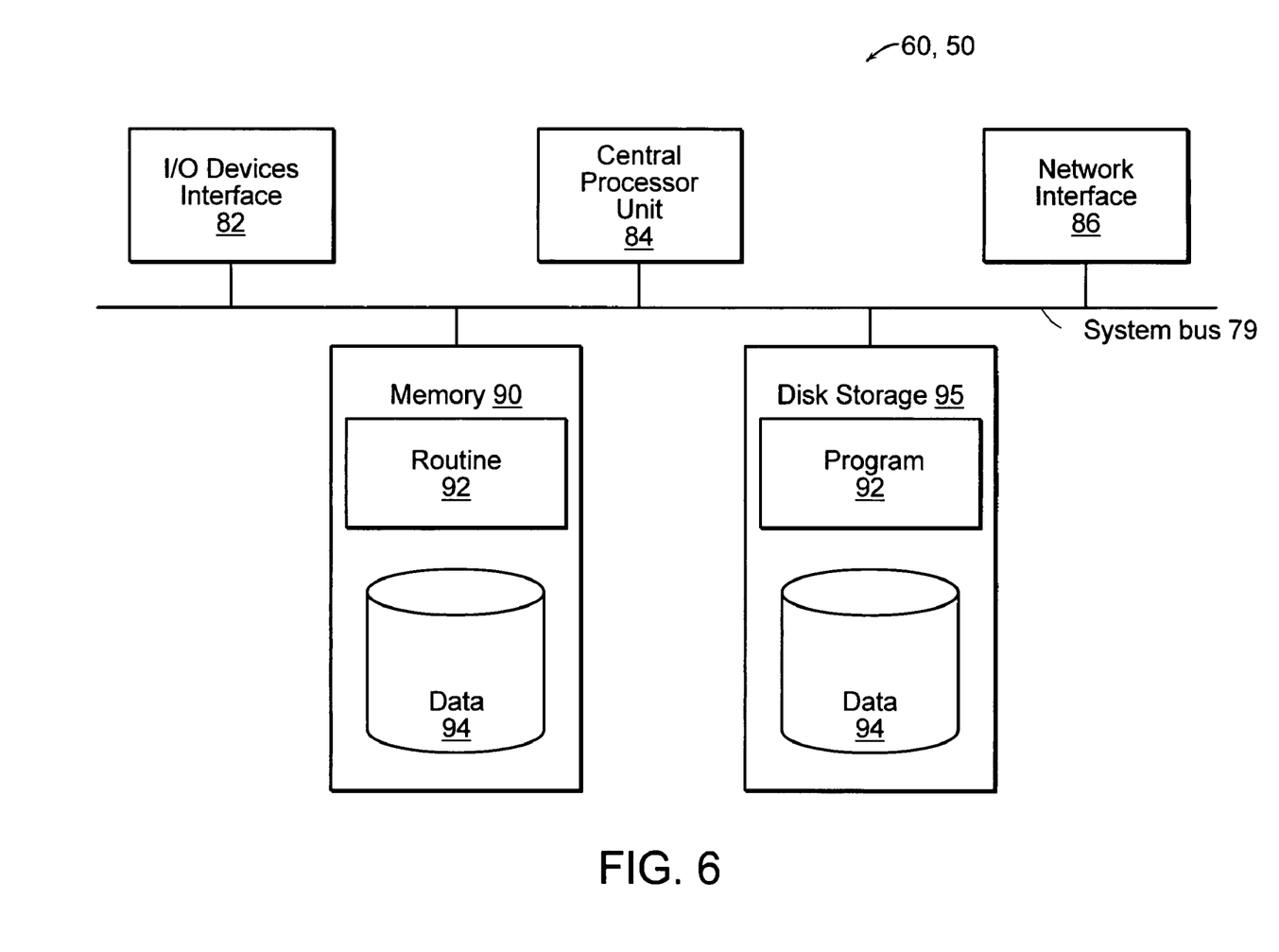
FIG. 6 is a block diagram detailing a client computer from FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions used to implement an embodiment of the present invention (e.g., Program Routines 92 and Data 94, detailed later). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Before delving into the technical details of the present invention, it could be helpful first, to liken a program metamodel (such as an EMF metamodel or similar program design model) to a relational database; which is justifiable since both are ways to formally specify, model and represent data entities and their relations in an abstract, structured way. In such a comparison, one finds that:

The metamodel is equivalent to the database schema and hence provides the table's definition, . . . etc.

A type (EClass) defined in the metamodel is equivalent to a database table. One notable difference though is that a type could inherit other types whereas tables in a relational database don't inherit from other tables. Nevertheless, this difference could be viewed as a way of automatically adding columns from the parent-table to the child-table when creating the child-table definition in the database schema.

An Attribute (EAttribute) of a given type is equivalent to data columns in a table, which must have a unique name within the table and can hold only a specific data type whereas a reference (EReference) in a given type to other type is equivalent to a foreign-key column to other table.

A Reference basically defines a link between two types, whether it is one-to-one (single reference), one-to-may (a collection of references), and this relationship could be bi-directional if both type/table hold a reference to each other, which would then transform the one-to-many relation to a many-to-many.

Models created using this metamodel represent database instances of this database schema.

A model element (EObject) represents a row in a specific database table.

In relational-databases deleting a row would sometimes cause a cascading deletion of other linked rows in other tables since their existence becomes meaningless. In the world of metamodel-databases, this is equivalent to deleting a row (EObject) that has a containment relation/link (i.e., owns) to other rows (EObject).

Validation for both kinds of databases could be viewed as a verification of the referential integrity of rows (EObject) in different tables and, making sure that constraints on the values in columns (Attribs+Refs) are not violated.

However, the metamodel-database has some peculiarities in contrast to relational-databases:

In a metamodel-database, each "row" (EObject) in its "table" (EClass) has an automatically generated id that is unique across all tables and all rows, which is the EObject identity (i.e., usually its memory address), whereas in relational-databases, the designer must explicitly specify a column for the row's unique id, and the uniqueness of this id is guaranteed only within its own table and not across tables in the database.

Relational-databases use type to arrange their rows whereas metamodel-databases use containment relations to arrange their rows. In other words, in a relational-database, all rows (EObject) of a given type (EClass) are put in one table representing this particular type, but in a metamodel-database, rows (EObject) of various type are scattered all over based on their containment relations and thus are arranged hierarchically as a tree. This difference in presentation and arrangement of data in both kinds models is natural since presentation is subservient to the purpose and usage semantics of its corresponding model.

This abstraction of the EMF metamodel 13—namely, rendering it as yet another database, provides a viable and flexible query framework on which Applicant bases the present invention.

Figure 1:
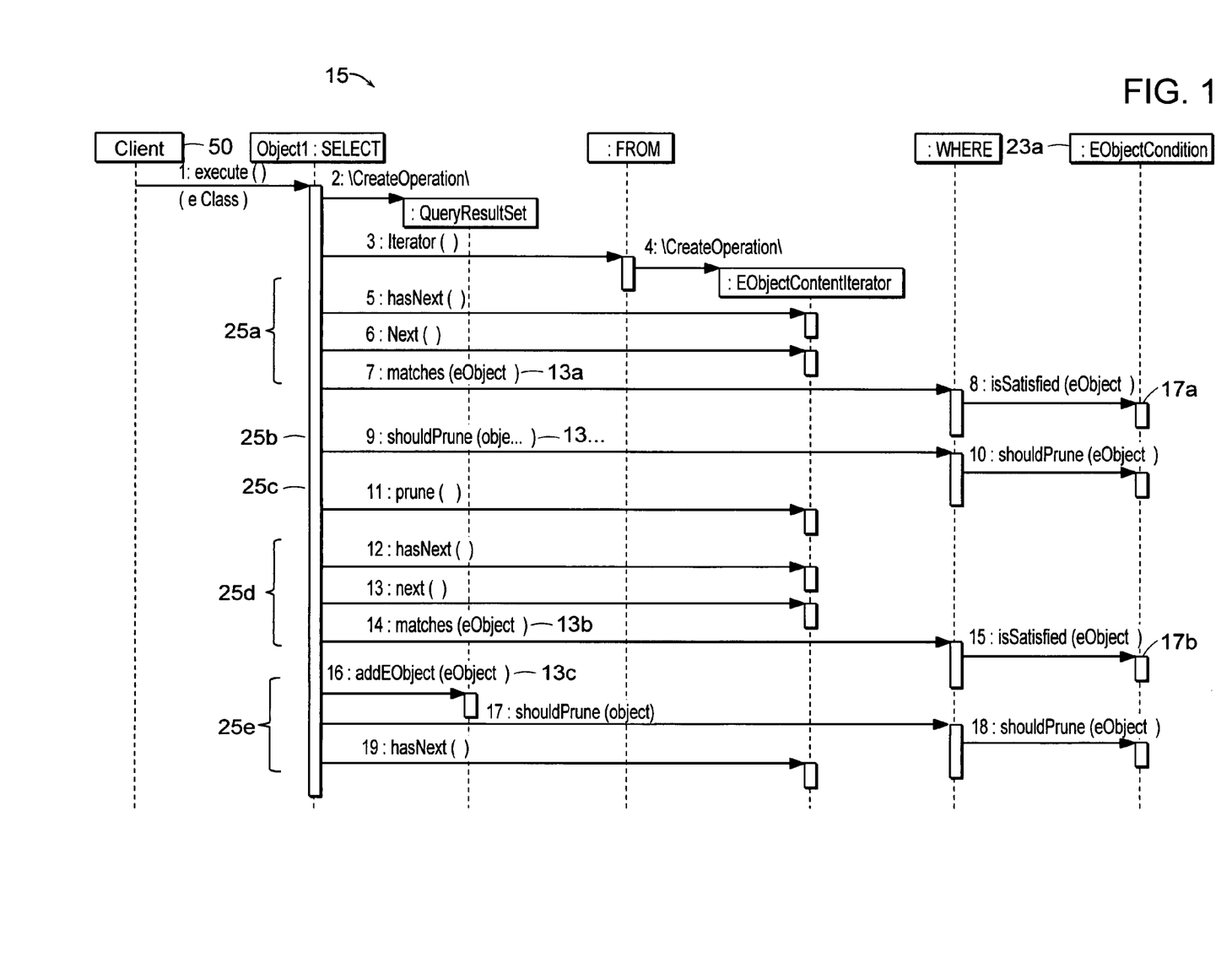
FIG. 1 is a flow diagram illustrating client execution of a SELECT statement in embodiments of the present invention.

Based on the above, Applicant maps (logically) an EMF model query 15 to SQL's SELECT query as follows and illustrated in the sequence diagram of FIG. 1. In its simplest form, a SELECT query iterates over specific table rows, checking the values contained in each specific column against some condition, and gathers only those rows whose columns' values meet the condition. This is basically what the EMF Query 15 (FIG. 1) is all about: iterate (at 25*a, b, c, d, e*) over model elements (eObjects) 13, and gather those 17 whose attributes/references' value satisfy some condition 23*a*.

To clarify things even further, let's use an example:
a UML metamodel defines a type Interface, which has an attribute called [name] which can hold string values.

In a relational-database world, this would be like having a table named Interface with a column named [name] of char data type. If a user wants to search for and collect all interfaces named "ICommand" in all namespaces (package), the SQL query would be:

SELECT*FROM Interface WHERE name="ICommand".

Looking at the above SELECT query statement one can see that, regardless of the nature and/or structure of the underlying database, every SELECT statement must provide the following:

(a) The source table(s) from which the result set rows will be retrieved, and (b) The condition(s) that the rows in the source table(s) must meet to qualify where a condition is basically a combination of one or more predicates using logical operators, and these conditions are to be evaluated against values in specific columns.

Therefore, the design of the present invention EMF Query method and apparatus 11 offers a comparable facility in order to allow clients 50 to express their queries freely regardless of the nature and structure of the underlying metamodel 13 being queried. This means the ability to specify the table (EClass) to look into, and the ability to specify which columns (Attribs+Refs) in these tables to apply the logically combined test condition(s), as opposed to limiting the client 50 by offering a pre-defined set of query-functions that perform a specific search, albeit that these functions allow for a degree of flexibility through parameters. Moreover, the present invention EMF Query framework 11—as in SQL—allows also for data-modification (write-ops e.g., UPDATE statement), besides the data-searching (read-only-ops e.g. SELECT) statement. On top of that, the present invention EMF Query framework 11—as in SQL—allows for the construction of advanced/complex queries (e.g., nested-queries/inner-joins . . . etc.), and finally, without burdening the client 50, the invention EMF Query framework 11,—as in SQL query engines—tries to optimize its performance (using indexing . . . etc.).

One point to keep in mind is that the query framework 11 is independent of the metamodel 13 definition in as much as the SQL query engine is independent of the database schema being queried. Clients in both cases must have sufficient knowledge of their databases schema/metamodel in order to be able to specify their queries correctly, and also, to formulate their search-conditions and queries more efficiently in terms of performance.

As mentioned earlier, the metamodel-database has a peculiar arrangement of its rows (EObject) as compared to the relational-database. The metamodel-database uses type-containment-relations to arrange its rows hierarchically in a tree, whereas the relational-database uses the type itself as a way of arranging its row into tables of that particular type. This difference has no impact on our conceptual characterization of a query in both kinds of databases, but rather on the internal way the search process is carried out in each case. In a relational-database, when the user specifies the table to look into, the SQL query engine can go directly to that table and iterate over its rows to conduct its search; whereas, in a metamodel-database, when the user specifies the table (EClass) to look into, the EMF Query method and apparatus 11 has no well-defined repository of all rows (EObject instances) of that type/table (EClass), and thus, it would have to basically traverse the model containment tree "hunting" for them. Nevertheless, it is important to note that the difference is but in data representation/arrangement level and not in the fundamental nature or the value of the data itself; and thus, both arrangements can be easily transformed to one another without affecting either the data integrity or the query result-set 17. To clarify things a little, a table is but a set of rows of a certain type, and a tree is but a set-of-sets of rows, nested—recursively as per tree depth—on the bases of type-containment. This means that tabulating a tree (i.e., transforming a tree arrangement to a table arrangement) is basically flattening the tree by traversing it and simply segregating its nodes into tables/sets based on type.

Figure 2:
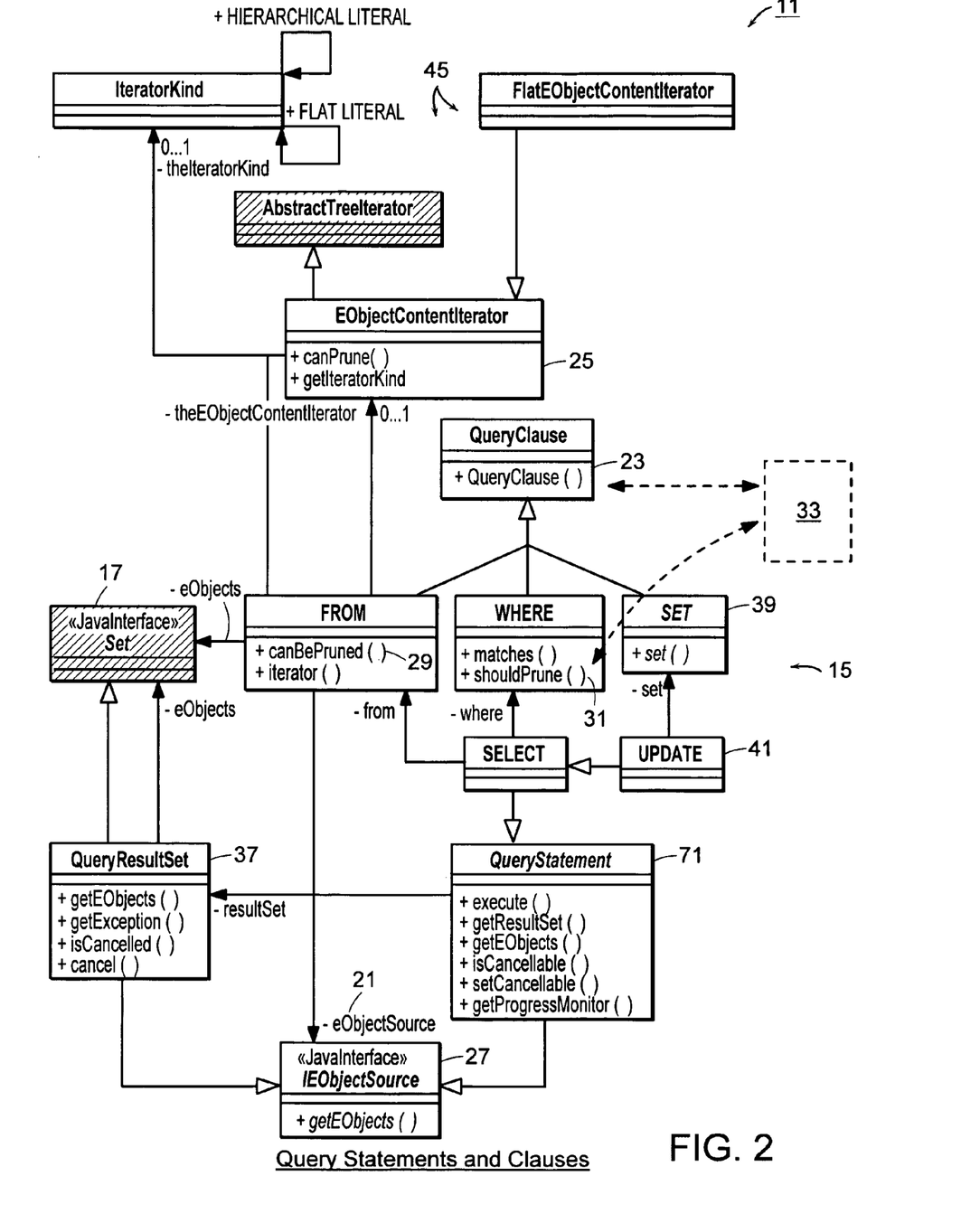
FIG. 2 is a schematic diagram of query statement handling in the present invention.
Figure 3:
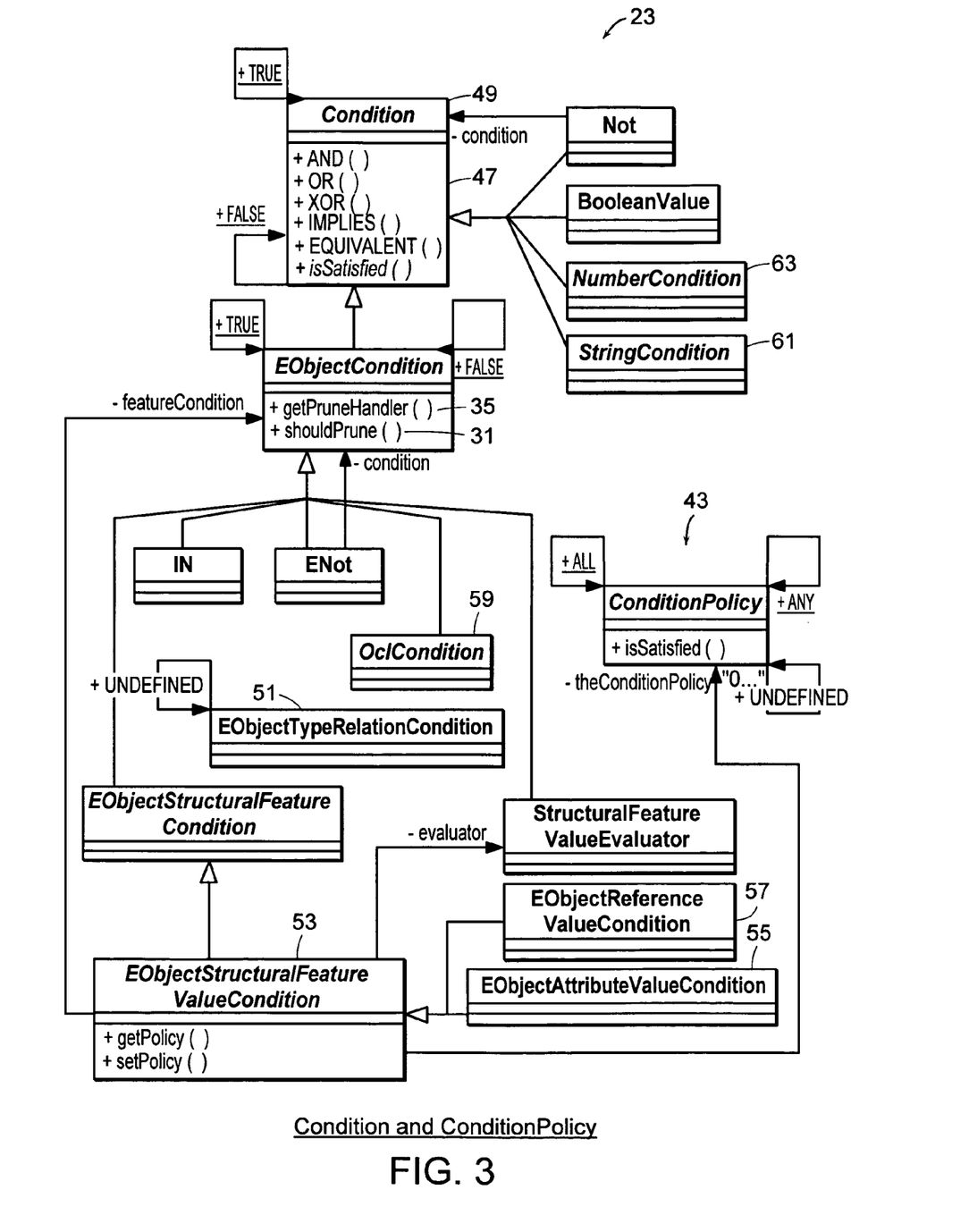
FIG. 3 is a schematic diagram of conditions handling in the present invention.
Figure 4:
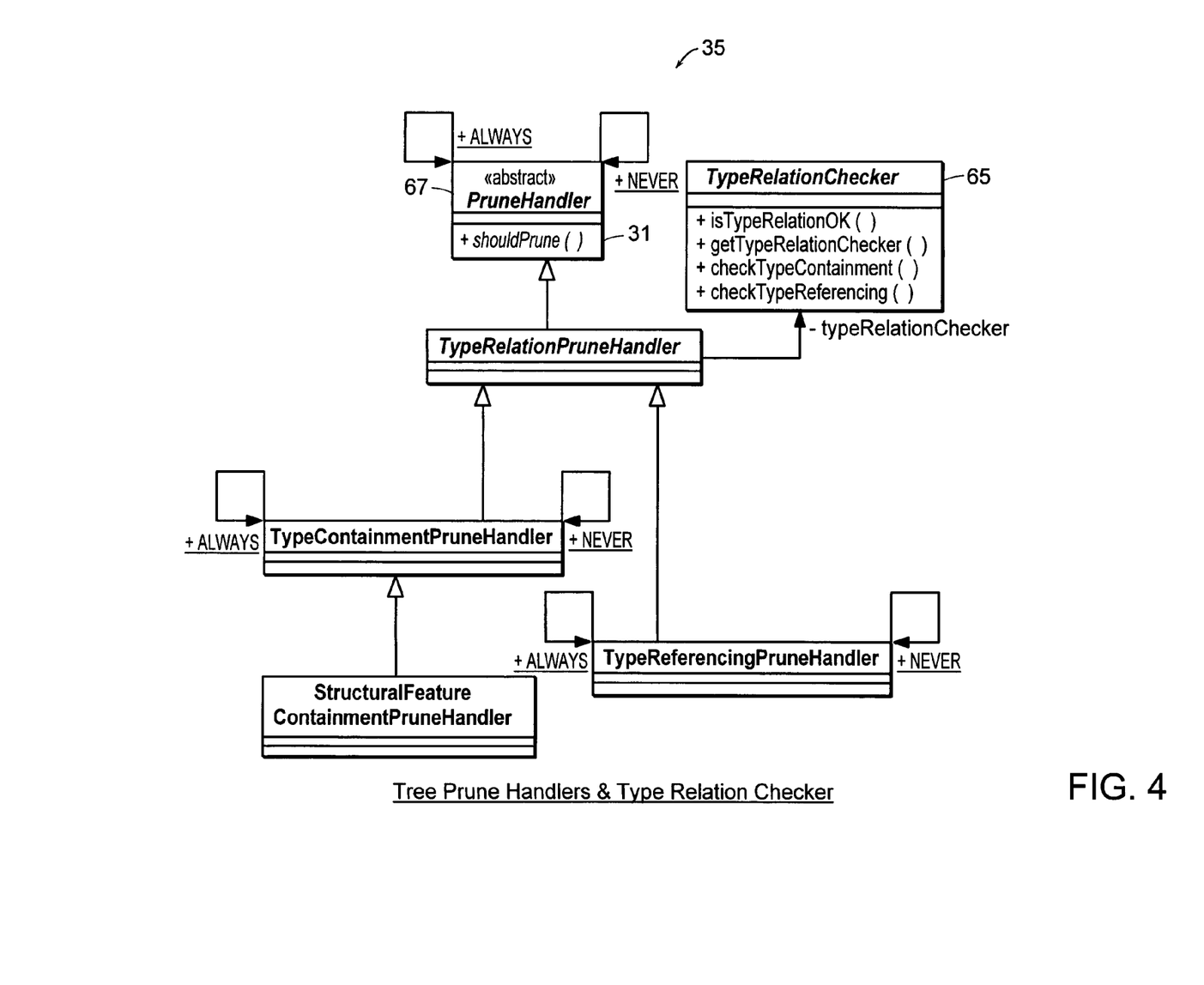
FIG. 4 is a schematic diagram of tree pruning handlers and type relation checkers employed by the present invention.

In light of the above, Applicant discloses the following design for an EMF query framework 11 as illustrated in FIGS. 2-4 which are class diagrams of the main classes of the invention method and apparatus 11.

The query method and apparatus 11 is responsive to initial input from the client 50. The input has two parts: model elements 21 and search-condition functions 23 (FIG. 2). The model-elements 21 represent the search-set 27. The search-condition functions 23 are functions to apply on the search-set 27. The query method and apparatus 11 uses a depth-first tree-iterator 25 to visit tree branches and nodes. A user may optionally supply a filter-condition 29 to the iterator 25, which is basically a condition that is applied on elements in the initial search set to decide on which elements to present to the search condition. Elements that are filtered-out by this filter-condition 29 are not considered for searching nor are their children. In other words, their entire containment branch is eliminated.

As for the search condition function-objects 23, the present invention query framework 11 provides basic functions for the user, which could be instantiated by different parameters to meet user's search requirements. Also at 31 clients can supply their own completely new subclasses of these conditions and simply plug them into the query framework 11.

The Conditions 49 (FIG. 3) the invention query framework 11 provides can be compounded by using logical operators to form new conditions. Therefore, a client 50 can utilize an already existing condition 49 written by someone else for different purposes and combine it with yet other conditions (e.g., newly written or existing) 23, 31 to form completely new conditions 49 that perform completely new queries 15. This design of condition objects 49 lends itself to building a small library 33 of commonly useful conditions 49, 31 that could be later reused to build more complex ones.

As illustrated in FIG. 4, the invention query framework 11 dynamically builds its own internal index maps 35 of type-containment-relations. These index maps 35 are built per metamodel 13 (FIG. 1) and not per model instance 21 or query 15, which means their cached indices are reused for all queries 15 executed against a given metamodel 13. The reason the index maps 35 are built dynamically is that the framework 11 has no a priori knowledge of the metamodel 13 being queried and the types it defines. Thus, generally speaking, executing the same query 15 a second time will be much faster. Index maps 35 of type-containment-relations basically answer the question: which types of elements can potentially contain—either directly or recursively—other types of elements.

When traversing the model-element containment tree (e.g., at 25, 31 and 45 of FIG. 2), the invention query framework 11 uses the index maps 35 as the default heuristics to prune the tree and improve performance. Nevertheless, the invention query framework 11 allows a client 50 to supply its own tree-pruning handlers to augment or even override the default one 67.

Search condition functions 23 overload the relevant subset of first-order predicate calculus (FOPC) operations, namely, the following logical connectives: AND, OR, XOR, NOT, IMPLIES (i.e., if-then), EQUIVALENT (i.e., if-and-only-if) as shown at 47 in FIG. 3. Therefore, clients can combine several conditions to express more complex search conditions 49.

A Condition Policy object 43 is provided to handle the evaluation of multiple-values attributes and references (i.e., those expressed as collections). These policies are: ANY (i.e., there-exists), and ALL (i.e., for-all).

With regard to another aspect of the present invention, the output of one query operation can be supplied as an input for another in the same breath. This supports the nested-queries feature. The invention query framework 11 imposes no limitations on the number of levels of nesting.

Returning to FIG. 2, query results 17 are returned as a Result-Set object 37, which is a mathematical set (union) of model elements 21 (EObject) that met the search conditions 23. The Result-Set object 37 also holds any exception that occurred while performing the query 15. The client can optionally state a maximum size of Result Set 17 to return. With such a threshold defined, the query 15 terminates automatically and does not iterate any further on model-elements 21 once the specified size is reached.

The invention query framework 11 also supplies a data-modification query statement 39 where the user can supply a value-setter for attributes and references of elements that meet certain search conditions 23, 49. The invention apparatus 11 is responsive and updates or otherwise adjusts query processing at 41 accordingly . . . .

All query operations are cancelable by default. The user can override such cancelability and in turn the very same operation's cancelability on or off as s/he sees fit.

Queries 15 can be resumed by clients 50, meaning a client can specify how many results at a time s/he wants to see by setting the maximum size of the result set 17, 37 to return. Then the client 50 can execute the query 15 to get a result set 17. At a later time, the client 50 can resume the very same query 15 so that apparatus 11 continues applying conditions 23, 49 on the remaining elements 21. The present invention apparatus 11 accordingly returns the next result set 17, and so on and so forth. This is akin to cursors in a database. It is noted if the underlying model changed between the execute-resume cycles, the query result is not guaranteed to be correct.

Following is a table that describes the major classes that comprise the EMF Query framework 11 in one embodiment:

| Interface/class | Description |
| --- | --- |
| QueryStatement (71, (FIG. 2) | An abstract parent class for all query statements (e.g., SELECT, UPDATE . . . etc.). |
| IEObjectSource (27, FIG. 2) | An interface that represents a provider for the search-space elements to be used in a query. It is implemented by all query result-sets and query-statements as well. |
| QueryClause (at 23, FIG. 2) | An abstract parent class for all query clauses used in query statements (e.g., FROM, WHERE, SET . . . etc.). |
| SELECT (at 15, FIG. 2) | A QueryStatement subclass; user must supply appropriate query clauses for it. Basically, it implements a template-function that does the iteration over model elements and applies the search condition on each; it collects the resulting elements into a QueryResultSet object and returns it to the caller. |
| UPDATE (41, FIG. 2) | A SELECT subclass; basically, it inherits the iteration functionality over model elements from its parent and simply passes those elements who satisfy the search condition to a caller-supplied modification function. It collects the modified elements into a QueryResultSet object and returns it to the caller. |
| QueryResultSet (37, FIG. 2) | Implements java.util.Set. It represents the set of elements returned by a given query. Could be empty if the user cancelled the query, or an exception occurred, or if no element matched the search condition. In case of an UPDATE query, it will contain the set of elements that got updated. If an exception occurred the result set would hold the exception object so that the caller can examine it. |

| Interface/class | Description |
| --- | --- |
| FROM (at 15, FIG. 2) | A QueryClause subclass it represents the elements to search. It is responsible for providing an appropriate iterator for the elements in the search space, be it a tree-iterator, or a flat iterator. As a query clause it must be passed to a query statement for it to perform its task. |
| WHERE (at 15, FIG. 2) | A QueryClause subclass. It applies the search conditions over the elements in the search set. As a query clause it must be passed to a query statement for it to perform its task. |
| SET (39, FIG. 2) | A QueryClause subclass. It is responsible for changing values of attributes and/or references of model elements passed to it in accordance with the user's requirements. Clearly, this clause is applicable only in the context of an UPDATE query statement (i.e., not a SELECT). |
| EObjectContentIterator (25, FIG. 2) | A depth-first tree iterator that is constructed by the FROM clause and passed to the query statement to iterate over model elements in the containment tree. |
| PruneHandler (67, FIG. 4) | An abstract parent for all prune-handlers. A prune-handler is responsible for deciding whether or not to prune a specific branch of the element-tree and thus not to visit any of the elements in its sub-branches. Used to add "smarts" to tree traversal in order to enhance performance. Subclasses include: TypeRelationPruneHandler, TypeContainmentPruneHandler, StructuralFeatureContainmentPruneHandler, and TypeReferencingPruneHandler. |
| Condition (at 49, FIG. 3) | The abstract parent class for search conditions used in queries. It has built-in overloaded operators to handle logical combinations with other Condition objects. It answers whether a given Object satisfies it or not. |
| EObjectCondition (FIG. 3) | A Condition subclass that is the abstract parent of all conditions that deal with model-elements (i.e., EObjects). Besides what it inherits from its parent, it incorporates the services of a PruneHandler in order to answer whether or not to prune the element tree at a specific element and thus ignore its children. |
| EObjectTypeRelationCondition (51, FIG. 3) | An EObjectCondition subclass, it answers whether a given model element type (EClass) is related to another type in terms of inheritance. |
| EObjectStructuralFeatureValueCondition (53, FIG. 3) | An EObjectCondition subclass. It is the parent class for conditions that are responsible for checking the values held in model-elements' attributes or references. Since attributes and references do not exist in vacuum, the EObjectStructuralFeatureValueCondition enlists the help of two other condition objects in order for it to do its task; the first is an EObjectCondition that is used to decide on the validity of context element (a context element is the model element whose attribute one is evaluating), the other condition is an evaluator Condition that it uses to evaluate the value held in the attribute or the reference and whether or not it matches what the user is looking for. |
| EObjectAttributeValueCondition (55, FIG. 3) | A specialization of EObjectStructuralFeatureValueCondition that is used to check the values in EAttributes of the EObject. |

-continued

| Interface/class | Description |
| --- | --- |
| EObjectReferenceValueCondition (57, FIG. 3) | A specialization of EObjectStructuralFeatureValueCondition that is used to check the values in EReference of the EObject. In EMF models, it is not uncommon for references to represent multiple layers of indirection, i.e., for an EReference's value to be yet another EReference to another EObject. |
| IEStructuralFeatureValueGetter | An interface used by the query framework to get values held in EReference of the EObject being queried. Needed to support Visualizer models EObjects. The framework provides a default implementation for this interface: EstructuralFeatureValueGetter class. For more details please refer to the section titled: Visualizer Model Support. |
| OclCondition (59, FIG. 3) | A subclass of EObjectCondition and the abstract parent class for all OCL conditions. It basically wraps an OCL constraint expression string and allows it to be integrated with other EObjectCondition. Currently has one concrete subclass: OclConstraintCondition. |
| StringCondition (61, FIG. 3) | A Condition subclass. It is basically what we term as value-condition, since it does not deal with EObjcets but rather with java data types: strings...etc. It is used to evaluate the value of string EAttributes. It is further specialized to StringValue, SubStringValue, StringRegularExpressionValue and StringLength Conditions. |
| NumberCondition (63, FIG. 3) | A Condition subclass. It is used to test for numeric values: equality or range. It supports all java's numeric primitive types and objects, e.g., int/java.lang.Integer, double/java.lang.Double . . . etc. |
| ConditionPolicy (43, FIG. 3) | Is used to allow the user to decide how to apply a given condition on a collection of a model-element EAttributes or EReferences values. Supports both the: exists (ANY) and for-all (ALL) semantics. |
| TypeRelation | An org.eclipse.emf.common.util.AbstractEnumerator subclass used to provide an enumeration for element's type (EClass) inheritance relations (e.g., basetype, subtype . . . etc.) as defined in the metamodel. |
| TypeRelationChecker (65, FIG. 4) | A helper class used to answer whether or not a given element type can contain another element type. Used by TypeRelationPruneHandler subclasses to help in deciding whether or not to prune a give branch. This class builds and caches its own index map of type containment relations dynamically. |

Following are a few examples for queries written using the query framework 11 of the present invention. Please note that this is not intended to be a tutorial on writing queries but rather, it is meant to give an illustration of how the invention framework 11 is used and how its different pieces fit together and operate.

Generally speaking, the metamodel being queried is a UML metamodel (using EMF as its metamodel). The examples have been somewhat simplified, except when noted, for the sake of clarity. Clients 50 are encouraged to write as strict conditions as possible, but not stricter. This helps the invention framework 11 to prune the tree and thus improve query 15 performance significantly. Lastly, a given query 15 can usually be expressed in several ways, all of which are logically correct and all of which yield the same result, but some are faster to process than others. This is the same as in writing SQL queries (or even in writing source-code) where the way the test conditions are logically combined makes a performance difference.

EXAMPLE 1

Using Logical Connectives with Conditions

The logical connectives supported by the Condition object 49 in the invention framework 11 are the following:
AND, OR, XOR, NOT, IMPLIES and EQUIVALENT.

Using a C++ operator overloading technique, the logical connectives are implemented as member functions of the Condition object 49 itself (except for the NOT, which is implemented as a Condition subclass). If one is to speak of associativity of these pseudo-operators, it is from left-to-right, and all are of equal precedence. These pseudo-operators are "stackable", meaning that the return result of any of these operator-functions is a new Condition object 49 that itself, in turn, may be combined with another Condition 49 using yet another logical-operator-function. This makes it easier for clients to construct complex conditions 49 on one line.

The behavior of these pseudo-operators is the same as their Java built-in counterpart except for IMPLIES and EQUIVALENT which have no built-in counterparts. For example, the second condition of the AND operator will not be evaluated if the first condition was false, whereas the second condition of the OR operator will not be evaluated if the first condition was true . . . etc. Needless to say, this implicit behavior of the logical-operators does make a difference when writing conditions, just as it does in the case of writing source-code.

Inasmuch as logical operators can have their precedence change by the use of parentheses, clients can change the order of evaluation (which is equivalent to changing the precedence of these pseudo-operators) by simply controlling which ones get executed first (again remember, they are but functions after all).

As an example, let C1, C2 and C3 represent different conditions, then:

Writing: C1.AND (C2).OR (C3)==C1 && C2||C3.

Whereas: C1.AND (C2.OR (C3))==C1 && (C2||C3).

Writing: new Not(C1).OR (C2)==!C1||C2.

Whereas: new Not(C1.OR(C2))==!(C1||C2).

EXAMPLE 2

Query for all Classes with a Given Name

The following example constructs and executes a query that asks for all classes in a given model that are named: "MyLostClass". An equivalent SQL query would be like:
SELECT*FROM classes WHERE name='MyLostClass'

Using the present invention EMF Query method and apparatus 11, the code would look like the following:

```
//get the model to query
EObject model = getModel( );
//build the Select statement
QueryStatement statement = new SELECT (
    new FROM(model),
    new WHERE(
      new EObjectTypeRelationCondition (
        CorePackage.eINSTANCE.getClass_( )) .AND (
      new EObjectAttributeValueCondition (
        CorePackage.eINSTANCE.
        getNamedModelElement_Name( ),
        new StringValue ("MyLostClass")))));
//execute query
QueryResultSet resultSet = statement.execute ( );
//now, print returned classes names
Iterator it = resultSet.iterator( );
while (it.hasNext ( ) ) {
  System.out.println(((Class) it.next( )).getName( ) );
}
```

As can be seen from the above example, the user must first construct the SELECT query statement, that takes two clauses, a FROM clause and a WHERE clause. The FROM clause needs a starting element(s), that represents the root of the tree to traverse, whereas the WHERE clause takes a search condition, which it will use to test model elements. In the above example, the search condition passed to the WHERE clause is a compound condition of two conditions ANDed together.

The first is: new EObjectTypeRelationCondition (CorePackage.eINSTANCE.getClass_( )), which means the element to look for must be of type Class.

The second is: new EObjectAttributeValueCondition (CorePackage.eINSTANCE.getNamedModelElement_Name( ), new StringValue ("MyLostClass")))

which means that the EAttribute that holds the name must have its String value equal to "MyLostClass".

It is noted that since the two conditions are ANDed together, the second condition that tests for the name value will not execute if the first condition that checks for type fails. Therefore, it is guaranteed that the name EAttribute will not to be tested unnecessarily since it exists for all Named ModelElements except for Classes.

It is noted that the client 50 could have passed in a Package object to the FROM clause (instead of a Model object) as the root for the tree to search. Naturally this would have cut down on the size of the tree and hence the time it takes for the query 15 to execute. The results though could be different, since the query 15 would return the classes contained in that particular package (or any of its subpackages) as opposed to returning all classes in the model as a whole.

If the client 50 knows beforehand that there is only one class instance in the model 13 with this name, the client 50 can improve the performance of the query 15 by simply setting the maximum size of the returned result set to 1. This is equivalent to SQL's TOP clause of the SELECT statement, which basically instructs the framework to stop traversing the tree and to return the result set once the specified number of elements pass the test-conditions. This would translate into significant time saving, specially if the element was found early on. To control the maximum size of the returned result set 17, the query writer must specify the "int maximumResultSize" argument for the SELECT statement's constructor as follows:

new SELECT (1, new FROM(model), new WHERE(. . . ));

Alternatively, the present invention framework allows the user to use custom test conditions for queries. The following is an example, which basically is equivalent to the original example query:

```
new SELECT (new FROM(getModel ( )), new WHERE
(new EObjectCondition( ) {
    public boolean isSatisfied (EObject element) {
      if (element instanceof Class) {
        if (( (Class) element). getName( ).equals("MyLostClass")) {
//$NON-NLS-1$
          return true;
        }
      }
      return false;
    }
    public boolean should Prune (EObject element) {
      return false;
    }
}));
```

EXAMPLE 3

Changing the Name of All Classes Named X to Y

Suppose the user wants to change the name of all classes (regardless of their package) from ResManager to ResourceManager. An equivalent SQL query would be like:
UPDATE classes SET name='ResourceManager' WHERE name='ResManager'

Using the present invention query framework 11, the user can change the name of all classes by executing the following UPDATE statement:

```
//get the model to use in the query
EObject model = getModel ( );
//build and execute the Update statement
new UPDATE(
    new FROM (model),
    new WHERE(
       new EObjectTypeRelationCondition (
          CorePackage.eINSTANCE.getClass_( ))) .AND (
          new EObjectAttributeValueCondition(
             CorePackage.eINSTANCE.getNamedModelElement_Name( ),
             new StringValue ("ResManager") ))),
    new SET( ) {
       public boolean set(EObject element) {
          ((Class) element).setName("ResourceManager");
          return true;
       }
}) .execute ( );
```

As can be seen from the above example, an UPDATE statement is constructed, passing it basically the same condition as used in the last example to get all classes named: "ResManager". Then the SET clause needed by the UPDATE statement to change the name of the classes to "ResourceManager" is supplied.

It is noted that although the UPDATE statement does return a QueryResultSet object containing the elements that were actually passed to the SET clause, the code above did not need the object for any further processing.

As a side note, the present invention method and apparatus 11 allows the programmer to combine the model-query-conditions with non-intrinsic model-query-conditions (e.g., application-specific custom conditions). For example, the programmer could have ANDed the conditions used in the Update statement above with an application-specific condition that would launch a dialog box displaying the class fully qualified name and asking the end-user to accept or deny the class name change. The following is illustrative:

```
//make an application-specific condition to use in the Update query
below
EObjectCondition userConfirmationCondition = new
EObjectCondition( ) {
    public boolean isSatisfied (EObject element) {
//launch a gui-dialog to ask the user to approve name change for this
particular class
       Dialog dialog = makeConfirmationDialog ( (Class) element);
       dialog.open ( );
       return (dialog.getReturnCode ( ) == Dialog.OK);
    }
    public boolean shouldPrune (EObject element) {
       return false;
    }
};
//build and execute the Update statement with the new condition
new UPDATE (
    new FROM (model),
```

-continued

```
    new WHERE(
       new EObjectTypeRelationCondition
(CorePackage.eINSTANCE.getClassifier ( ) ) .AND(
          new EObjectAttributeValueCondition (
             CorePackage.eINSTANCE.
             getNamedModelElement_Name( ),
          new StringValue ("ResManager") ))
       .AND (userConfirmationCondition) ),
    new SET( ) {
    public boolean set (EObject element) {
       ( (Class) element) .setName ("ResourceManager");
       return true;
    }
}) .execute( );
```

Needless to say, the programmer could have opted to incorporate the code for the confirmation dialog within the code of the SET clause itself before changing the class name.

EXAMPLE 4

Getting All Direct Subclasses of a Given Class

Please note the following query is artificially made complex for purposes of illustration.

Suppose the user wants to get all the direct subclasses for a given class in the model. An equivalent SQL query (expressed as an inner-join and not as a sub query) would be like this:

```
SELECT * FROM classes AS Classes1 JOIN classes AS Classes2
    ON (Classes1.ParentClassIdentity = Classes2.Identity)
    WHERE Classes2. Identity = CAFEBABE
where CAFEBABE is the hex representation of the pertinent memory
address
    The following is a present invention query statement that does the same:
    //get the class instance whose children are being sought
    Class parentClass = getParentClass ( );
    //build the SELECT statement, execute it and get the result-set's Iterator
    Iterator it =
    new SELECT(
       new FROM(
          new SELECT(
             new FROM(getModel ( )),
             new WHERE(
                new EObjectTypeRelationCondition (
                   CorePackage.eINSTANCE.getClass_( ) )))),
       new WHERE(
          new EObjectReferenceValueCondition(
             CorePackage.eINSTANCE.
             getNamedModelElement_Relationship( ),
             new EObjectTypeRelationCondition (
                CorePackage.eINSTANCE.getGeneralization( ) ) .AND (
                new EObjectReferenceValueCondition(
                   RelationshipsPackage
                      .eINSTANCE
                      .getSimpleRelationship_NonOwningEnd( ),
                   new EObjectInstanceCondition (parentClass) ))))) .
execute ( ).
iterator( );
//now, print returned class elements names
while (it.hasNext ( )) {
    System.out.println ( ( (Class) it.next( ) ) .getName( ) );
}
```

As can be seen, the query code above uses a nested query to get the results back. As a matter of fact, using nested queries in this case is unnecessary, i.e., the same query could have been reformulated differently without the need to use an inner query; it was used here solely for illustration. In general, inner-queries can be avoided altogether by appropriately combining their test-conditions with the test-conditions of the outer-query.

The above query is a bit more complex than the previous ones, so let's look at its components:

---
The Inner-Query:
---
```
new SELECT(
    new FROM(getModel ( ) ),
    new WHERE(
        new EObjectTypeRelationCondition (
            CorePackage.eINSTANCE.getClass_( ) )));
```
---

This sub-query basically gets passed the model to search, and then it only picks up elements of type Class from within the given model. The output of this inner-query is passed as an input for the outer-query.

---
The Outer-Query:
---
```
new SELECT(
    new FROM(...), //input here is the output of the inner-query
    new WHERE(
        new EObjectReferenceValueCondition(
            CorePackage.eINSTANCE.
                getNamedModelElement_Relationship( ),
            new EObjectTypeRelationCondition (
                CorePackage.eINSTANCE.getGeneralization( ) ) .AND (
            new EObjectReferenceValueCondition(
                RelationshipsPackage
                    .eINSTANCE
                    .getSimpleRelationship_NonOwningEnd( ),
                new EObjectInstanceCondition (parentClass) ))))); 
```
---

This outer-query gets its search-set of elements from the inner sub-query, which are all model elements of type Class (as discussed above). The condition it uses is of kind:

---
EObjectReferenceValueCondition:
---
```
new EObjectReferenceValueCondition(
    CorePackage.eINSTANCE.getNamedModelElement_Relationship( ),
    new EObjectTypeRelationCondition (
        CorePackage.eINSTANCE.getGeneralization( ) ) .AND (
    new EObjectReferenceValueCondition(
        RelationshipsPackage
            .eINSTANCE
            .getSimpleRelationship_NonOwningEnd( ),
        new EObjectInstanceCondition (parentClass) )));
```
---

The EObjectReferenceValueCondition conditions are used to check the value held by a reference of a given EObject. It takes two arguments in its constructor: the EReference, which is the meta-object for the reference being sought, and an evaluator-condition (the last seven lines in the above condition block of code) to evaluate the value contained in this reference. In the above example, the EReference is a reference for a Relationship "CorePackage.eINSTANCE.getNamedModelElement_Relationship( )". Since the query is about sub-classes, the evaluator-condition has to first verify that the type of the Relationship is a Generalization relation using the following condition:

new EObjectTypeRelationCondition (CorePackage.eINSTANCE.getGeneralization( ));

Then, the evaluator-condition ANDs the above condition with another one that checks the value held in the NonOwningEnd EReference of the Generalization object, to see if it is the parent class instance the user specified:

new EObjectReferenceValueCondition(RelationshipsPackage .eINSTANCE .getSimpleRelationship_NonOwningEnd( ),
new EObjectInstanceCondition (parentClass));

Alternatively, the client could write the following custom query to get exactly the same result:

---
```
new SELECT(new FROM(getModel( ), new WHERE(new
EObjectCondition( )
{
    public boolean isSatisfied (EObject element) {
        if (element instanceof Class) {
            Iterator it = ((Class) element).getRelationship( ).iterator( );
            while (it.hasNext( ) ) {
                Object relation = it.next( );
                if (relation instanceof Generalization) {
                    return ( (Generalization) relation)
                        .getNonOwningEnd( )
                        .equals(
                            getParentClass( ) );
                }
            }
        }
        return false;
    }
    public boolean shouldPrune (EObject element) {
        return false;
    }
}));
```
---

The Object Constraint Language (OCL) is a language for expressing constraints on model elements. OCL expressions set forth rules in the form of: (i) conditions, invariants and restrictions attached to model elements, (ii) preconditions and post conditions attached to operations and methods, and (iii) guard conditions. When attached to a class, OCL expressions specify rules to which objects of the class must adhere.

With regard to OCL Constraints Integration, in one embodiment OCL2 constraint classes are integrated with the present invention query framework 11. This is achieved by the creation of EObjectCondition wrapper classes, namely, OclCondition 59 (FIG. 3) and OclConstraintCondition. These wrapper classes delegate the actual evaluation of the condition to the underlying OCL2 constraint classes. As such, OCL2 constraints can be logically combined with any other user created EObjectCondition to formulate a more complex and more expressive conditions than either kind of condition can offer alone.

OCL2 syntax and semantics generally follow the UML2 specification.

In other embodiments, the present invention EMF query framework 11 accesses EObjects created by dynamically/on-demand constructed EMF models. These EObjects are not fully populated with content at creation time. Thus, resolving EReferences in the dynamically/on-demand constructed EObject is not handled at the EObject level itself as is the case with classical EObjects. That is, passing an EObject to the framework 11 would have resulted in returning wrong results for the client if the query had a condition that needed to assess the value held in a given EReference (which would have not been resolved). Specifically, invoking the following two functions:

(1) Object eGet(EStructuralFeature feature, boolean resolve) function, which returns the value held in an EReference or in an EAttribute, and the (2) EList eContents( ) function, which returns a list of all EObjects held in all containment EReferences on dynamically/on-demand constructed EObjects would return wrong values.

The present invention solution introduces a layer of indirection that handles resolving the EReference values correctly. In these embodiments, Clients 50 are required to pass in an implementation for the IEStructuralFeatureValueGetter interface that is called upon by the query framework 11 to extract values held in EReferences. A default implementation of this interface exists for classical EObjects that obey the EObject contract, whereas a special one must be passed in by clients 50 when the EObjects being queried need some special processing to get the correct values (e.g., dynamically/on-demand constructed EObjects).

While this invention has been particularly shown and described with references to preferred embodiments thereof, it will be understood by those skilled in the art that various changes in form and details may be made therein without departing from the scope of the invention encompassed by the appended claims.

For example, the term "carrier means" or transient carrier encompasses transient signals, propagated signals/medium, storage medium and the like.

Further the present invention may be employed in a stand alone computer architecture as well as in computer network systems. FIGS. 5 and 6 and corresponding "client", "server" terms are for purposes of illustration and not limitation of the present invention.

In one embodiment, there is no physical process of translating a metamodel tree into a database or an EObject into a row of a database table. Instead, a logical mapping is used as an approximation of the two forms of representation (tree versus database tables). Similarly, the EMF queries (metamodel side) are likened to relational database (e.g., SQL) queries without actually creating SQL queries. This leads to the abstraction of the underlying metamodel and hence the queries targeting it.

In other embodiments, there may be a physical translation of the metamodel tree into a database. The EMF model is exported as an SQL database for example. In turn such an SQL database is importable into a database engine. Likewise, the EMF queries are exported as SQL queries which are then executed against the subject database engine.

In all of the embodiments above, the described operations/functions of the present invention are dynamically performed without having the metamodel creator or the metamodel clients being aware of the same.

What is claimed is:

1. A computer implemented method for querying program design models, comprising the steps of:
    obtaining a tree structure representation of a subject metamodel, the subject metamodel being formed of model elements, the tree structure representing model hierarchy of the model elements;
    obtaining a database representation of the model elements;
    mapping the tree structure representation to the database representation of the model elements by:
        translating the tree structure representation to the database representation, the translating of the tree structure representation maintaining metamodel semantics of the model elements from the tree structure representation to the database representation of the model elements, the database representation being an abstraction of the metamodel;
        forming a query statement corresponding to the tree structure representation and mapping said formed query statement to a computer implemented query statement corresponding to the database representation to search and retrieve certain model elements from the database representation; and
    using the mapped computer implemented query statement, arriving at the certain model elements of the subject metamodel; and
    outputting the certain model elements as query results.

2. A method as claimed in claim 1 wherein the step of mapping the tree structure representation includes considering each model element as a respective row in a respective database table; and
    at least abstractly defining database tables according to respective model element type.

3. A method as claimed in claim 1 wherein the step of mapping the formed query statement includes logically mapping a model query to a database query statement.

4. A method as claimed in claim 1 wherein the database representation is based on a relational database; and
    the step of mapping the formed query statement includes logically mapping a query of the subject metamodel to an SQL query statement.

5. A method as claimed in claim 4 wherein the SQL query statement is a SELECT statement.

6. A method as claimed in claim 1 wherein the steps of obtaining, mapping the tree structure representation, and outputting are computer implemented in response to a user querying the subject metamodel.

7. The method of claim 1, wherein the subject metamodel is a UML metamodel, and wherein the computer implemented query statement is independent of the nature and structure of the UML metamodel, and wherein the computer implemented query statement includes a framework that is independent of a metamodel definition and independent of a predefined database schema.

8. The method of claim 1, wherein the step of mapping the tree structure representation includes exporting the tree structure representation to a relational database; and
    the step of mapping the formed query statement includes exporting the query statement corresponding to the tree structure representation to a relational database query statement.

9. Computer apparatus for querying program design models, comprising:
    a source providing a tree structure representation of a subject metamodel, the subject metamodel being formed of model elements;
    processor means operatively configured to (i) obtain a database representation of the model elements, and (ii) map the tree structure representation to the database representation of the model elements by translating the tree structure representation to the database representation; and
    a query engine responsive to the processor means, said query engine forming query statements with respect to the database representation to search for and retrieve model elements from the database representation, using the formed query statement the query engine arriving at the model elements of the subject metamodel, and outputting the model elements as query results.

10. Computer apparatus as claimed in claim 9 wherein the processor means for mapping effectively flattens the tree structure representation.

11. Computer apparatus as claimed in claim 9 wherein the processor means for mapping provides any combination of:
(a) approximating a model element as a respective row in a respective database table, and (b) at least abstractly defining a database table according to respective model element type.

12. Computer apparatus as claimed in claim 9 wherein the database representation is a relational database.

13. Computer apparatus as claimed in claim 12 wherein the query engine logically maps a query of the subject metamodel to an SQL query statement.

14. Computer apparatus as claimed in claim 13 wherein the SQL query statement is a SELECT statement.

15. A computer program product comprising a computer readable storage medium having computer readable program code for controlling a processor to provide querying of program design models, wherein the computer readable program code when executed on a computer carries out the steps of:
- obtaining a tree structure representation of a subject metamodel, the subject metamodel being formed of model elements;
- obtaining a database representation of the model elements;
- mapping the tree structure representation to the database representation of the model elements, the mapping enabling translating from the tree structure representation to the database representation;
- forming a query statement corresponding to the tree structure representation and mapping from said formed query statement to a computer implemented query statement corresponding to the database representation to search and retrieve model elements from the database representation; and
- using the computer implemented query statement, arriving at and outputting as query results the model elements of the subject metamodel.

16. A computer program product as claimed in claim 15 wherein the step of mapping includes approximating each model element as a respective row in a respective database table.

17. A computer program product as claimed in claim 15 wherein the step of mapping includes at least abstractly defining database tables according to respective model element type.

18. A computer program product as claimed in claim 15 wherein the step of forming includes logically mapping a model query to a database query statement.

19. A computer program product as claimed in claim 15 wherein the database representation is based on a relational database; and
- the step of forming includes logically mapping a query of the subject metamodel to an SQL query statement.

20. A computer program product as claimed in claim 19 wherein the SQL query statement is a SELECT statement.

21. A computer program product as claimed in claim 15 wherein the steps of obtaining, mapping and forming are carried out in response to a user querying the subject metamodel.

22. A computer program product as claimed in claim 15 wherein the steps are dynamically carried out.

* * * * *